(12) United States Patent
Cheng

(10) Patent No.: US 10,617,989 B2
(45) Date of Patent: Apr. 14, 2020

(54) TRANSVERSE SECONDARY DUST COLLECTOR

(71) Applicant: SAN FORD MACHINERY CO., LTD., Taichung (TW)

(72) Inventor: Yuan-Tai Cheng, Taichung (TW)

(73) Assignee: SAN FORD MACHINERY CO., LTD., Taichung (TW)

( * ) Notice: Subject to any disclaimer, the term of this patent is extended or adjusted under 35 U.S.C. 154(b) by 263 days.

(21) Appl. No.: 15/943,463

(22) Filed: Apr. 2, 2018

(65) Prior Publication Data

US 2019/0299141 A1 Oct. 3, 2019

(51) Int. Cl.
| | |
|---|---|
| *B01D 45/12* | (2006.01) |
| *B01D 45/16* | (2006.01) |
| *B01D 46/24* | (2006.01) |
| *B01D 46/00* | (2006.01) |
| *B01D 46/40* | (2006.01) |

(52) U.S. Cl.
CPC ......... *B01D 46/2403* (2013.01); *B01D 45/12* (2013.01); *B01D 45/16* (2013.01); *B01D 46/0013* (2013.01); *B01D 46/403* (2013.01); *B01D 2201/081* (2013.01); *B01D 2273/30* (2013.01)

(58) Field of Classification Search
CPC ................................ B01D 45/12; B01D 45/16
USPC .................................. 55/459.1, 429; 15/353
See application file for complete search history.

(56) References Cited

U.S. PATENT DOCUMENTS

2018/0353032 A1* 12/2018 Conrad ................. A47L 9/2884

* cited by examiner

*Primary Examiner* — Robert A Hopkins
(74) *Attorney, Agent, or Firm* — Sinorica, LLC

(57) ABSTRACT

A transverse secondary dust collector is to have a sealable housing transversely provided therein with a blower set, an air intake barrel and an air guide barrel. Thus, after outside dust is sucked into the air intake barrel, the dust will produce helical airflow at the inner wall of the air guide barrel. In the process of sucking in dust, heavy dust will reduce kinetic energy and naturally fall into the dust collecting barrel, while light dust will be attracted by the blower set and guided to get into the filter barrel, and after filtration, clean air will be exhausted to the outside. The blower set, the air intake barrel, the air guide barrel and the dust collecting barrel of the transverse secondary dust collector can be collectively installed in the housing, able to diminish the volume of the dust collector and lower noise.

9 Claims, 7 Drawing Sheets

TRANSVERSE SECONDARY DUST COLLECTOR

BACKGROUND OF THE INVENTION

1. Field of the Invention

This invention relates to a dust collector, particularly to a transverse secondary dust collector.

2. Description of the Prior Art

A conventional secondary dust collector 200, as shown in FIG. 1, includes an air guide barrel 1 having its topside provided with a blower 2 and its underside provided with a dust collecting barrel 3. The blower 2 is connected with a pipe 4, which has another end connected with a filter barrel 5, and a dust collecting bag 6 is assembled beneath the filter barrel 5. Thus, when the blower 2 is started to produce suction to have outside dust and air sucked into the air guide barrel 1, the dust will helically sink and flow along the inner circumferential wall of the air guide barrel 1 and then get into the dust collecting barrel 3. Meanwhile, comparatively heavy dust contained in the dust will be first filtrated and removed by the dust collecting barrel 3 and the rest of the dust accompanying the air will flow to the filter barrel 5 to have the rest light dust filtrated and removed and then have clean air exhausted to the outside, thus able to attain effect of filtrating and removing dust in the environment.

However, since the conventional secondary dust collector is to have the dust sinking and falling along the inner wall of the air guide barrel by gravity; therefore, the conventional secondary dust collector is designed vertically, that is to say, the blower 2, the air guide barrel 1 and the dust collecting barrel 3 must be provided in sequence from the above to the below. Thus, the air guide barrel 1 must be high enough for increasing frictional force of the dust and the air guide barrel 1 to enable the dust to smoothly fall into the dust collecting barrel 3. Nevertheless, in case the dust collector 200 is excessively high, the installation space for the dust collector 200 will be limited and further the dust collector 200 will be difficult in maintenance. In addition, the conventional dust collector 200 is bulky in volume and can hardly install sound-insulation equipment and hence loud noise will be produced in an operation process of the dust collector 200. Therefore, having observed the above-mentioned drawbacks, the inventor of this invention thinks that the conventional dust collector has to be improved and thereupon devises this invention.

SUMMARY OF THE INVENTION

The objective of this invention is to offer a transverse secondary dust collector, able to diminish the volume of the dust collector for reducing occupied space and able to lower noise.

The transverse secondary dust collector in the present invention includes a housing formed with an accommodating space provided therein with a dust collecting barrel and a filter barrel, and characterized by a blower set, an air intake barrel, an air guide barrel and a stopping unit. The blower set is transversely installed in the accommodating space, consisting of a blower motor and blast hood, and the blower motor has its rotating shaft inserted in the blast hood and fixed thereon with a plurality of blades, while the blast hood is bored with an air outlet, and the filter barrel is positioned beneath the air outlet. The air intake barrel being a hollow barrel has one end connected with the blast hood and is provided with an air inlet along the tangent of the barrel, and the air inlet is inserted with an air intake pipe. The air guide barrel has one end communicating with another end of the air intake barrel and has another end provided with a baffle plate and further the air guide barrel has a lower wall bored with an air guide opening facing downward, and inserted with a connecting pipe, which has another end connected with the dust collecting barrel positioned beneath the air guide barrel. The stopping unit is mounted in the air guide barrel, containing a support member and a stopping head. The support member has one end vertically secured with the baffle plate and another end connected with the stopping head.

After the blower motor is started, outside dust will be sucked into the air intake barrel through the air inlet and then, helical airflow will produce at the inner wall of the air guide barrel. In the process of sucking in dust, heavy dust will reduce kinetic energy and naturally fall into the dust collecting barrel below, while light dust will be attracted by the blower set and guided to flow into the filter barrel and after filtration, clean air will be again exhausted to the outside. In this invention, the blower set, the air intake barrel, the air guide barrel, the filter barrel and the dust collecting barrel can be collectively installed in the housing, able to attain effects of diminishing the volume of the dust collector and lowering noise.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
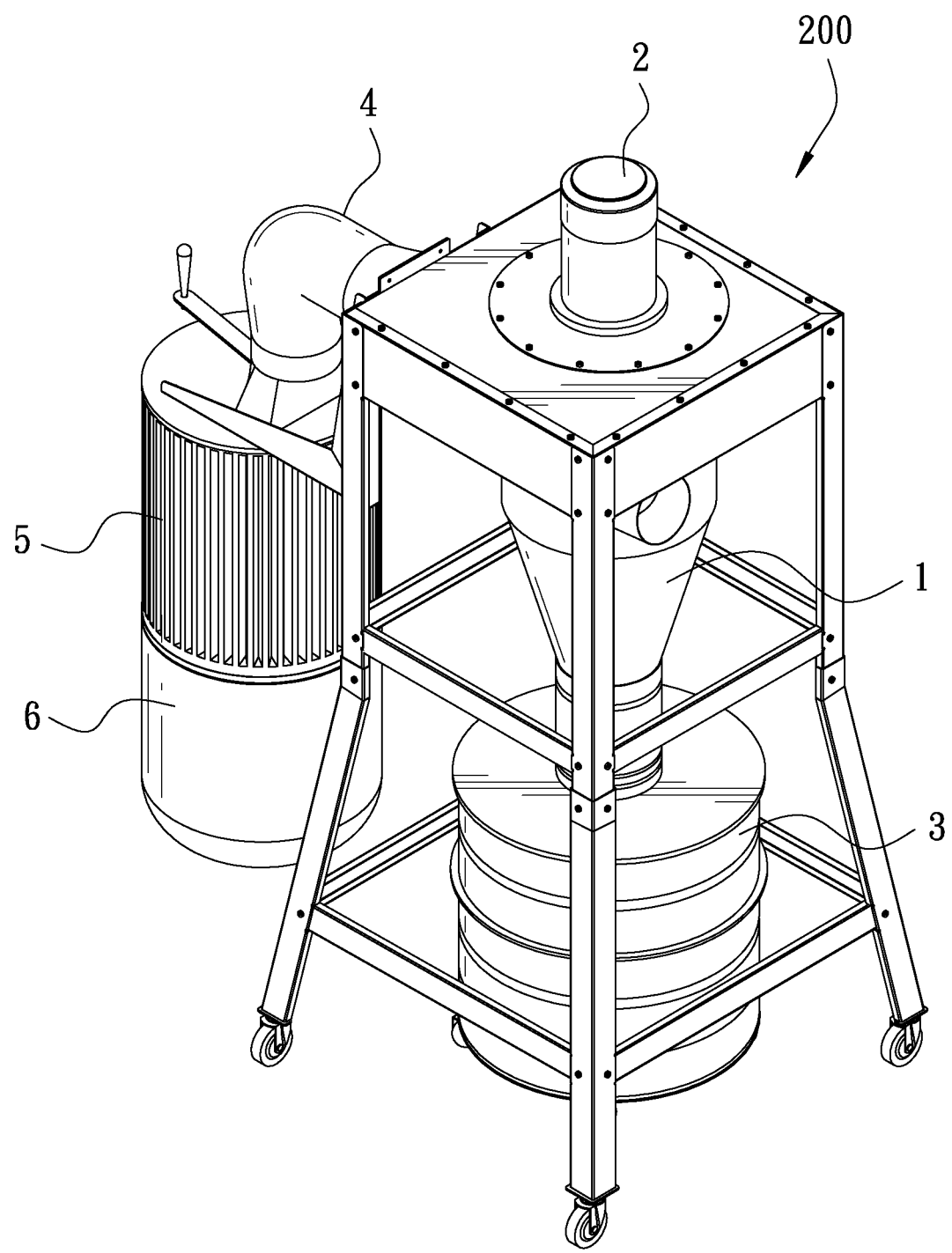
FIG. 1 is a perspective view of a conventional secondary dust collector.
Figure 2:
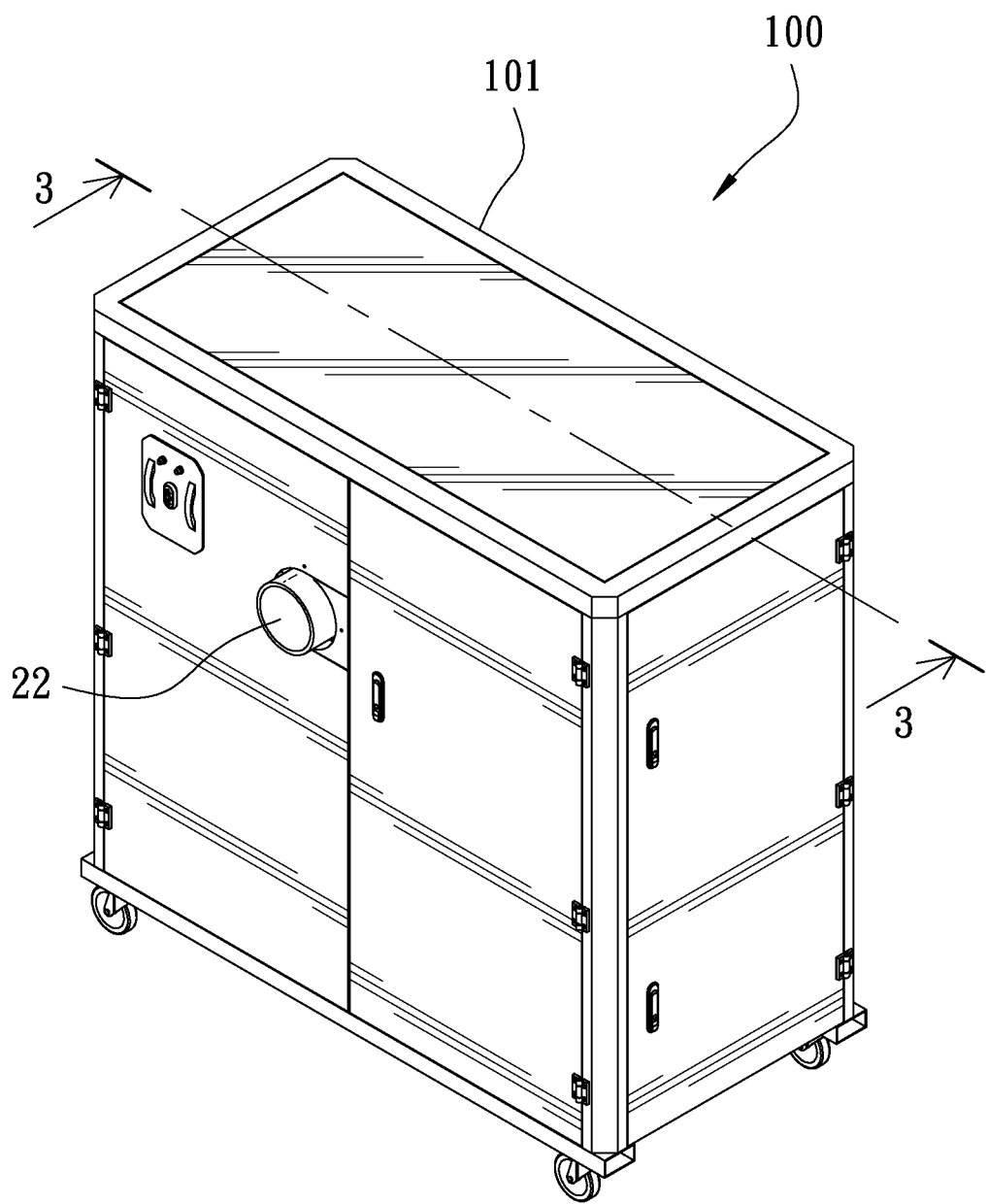
FIG. 2 is a perspective view of a transverse secondary dust collector in the present invention.
Figure 3:
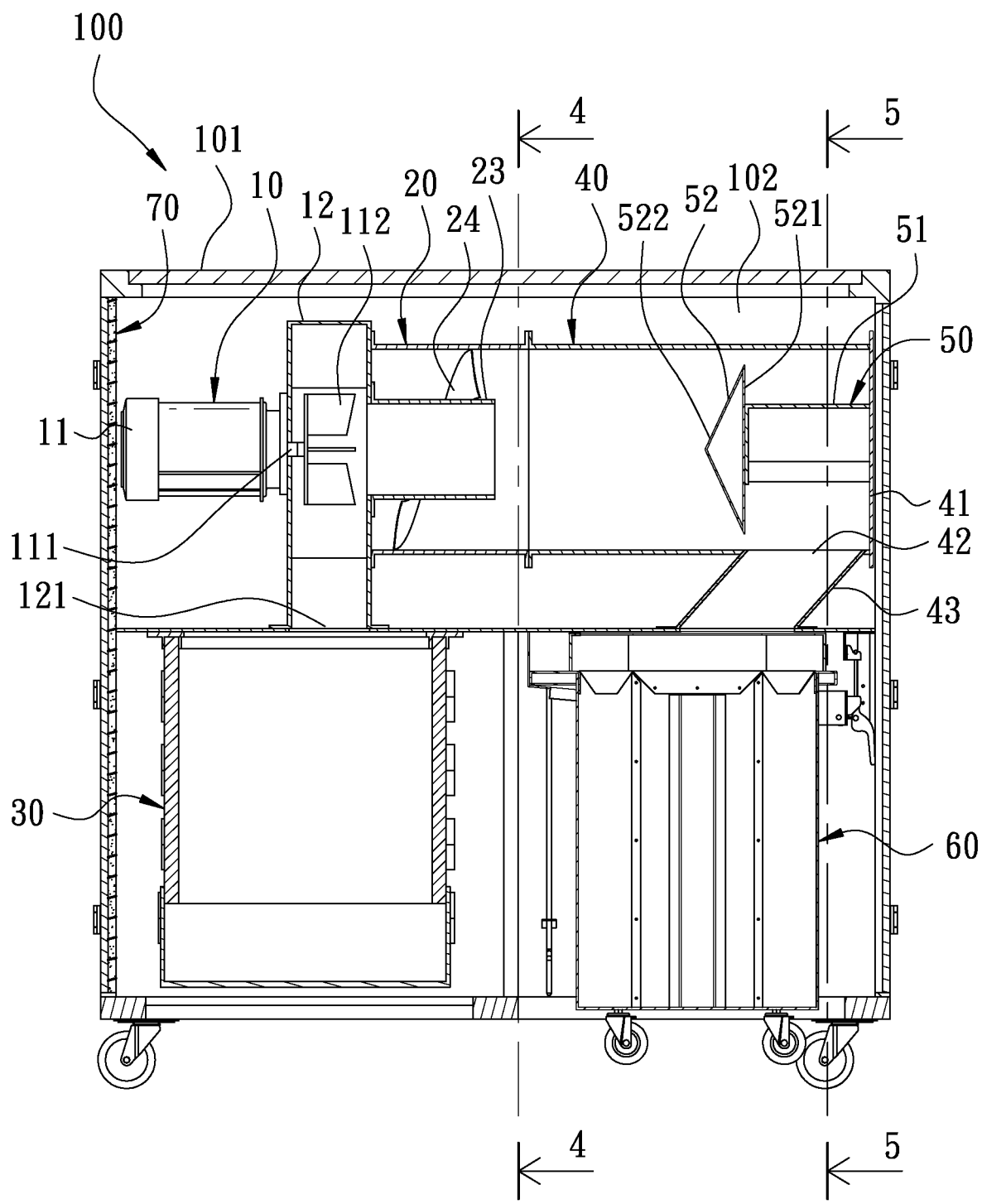
FIG. 3 is a cross-sectional view taken along line 3-3 of FIG. 2.
Figure 4:
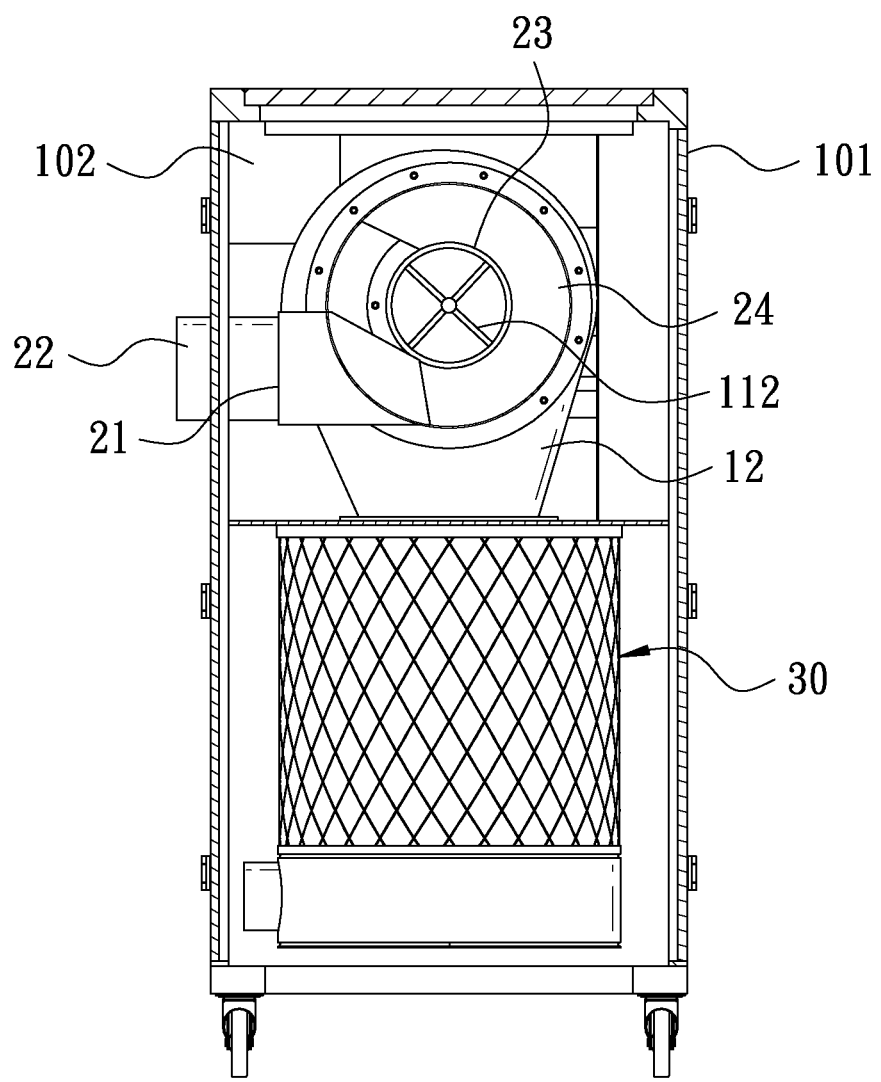
FIG. 4 is a cross-sectional view taken along line 4-4 of FIG. 3.

A preferred embodiment of a transverse secondary dust collector 100 in the present invention, as shown in FIGS. 2, 3 and 4, contains a sealable square housing 101 formed with an accommodating space 102. The transverse secondary dust collector 100 includes a blower set 10, an air intake barrel 20, a filter barrel 30, an air guide barrel 40, a stopping unit 50, a dust collecting barrel 60 and a plurality of sound-absorbing cottons 70.

The blower set 10 is transversely received in the accommodating space 102, consisting of a blower motor 11 and a blast hood 12. The blower motor 11 has a rotating shaft 111 inserted in the blast hood 12 and fixed thereon with a plurality of blades 112, and the blast hood 12 is formed with an air outlet 121.

The air intake barrel 20 is a hollow barrel and has one end connected with the blast hood 12. The air intake barrel 20 is provided with an air inlet 21 along the tangent of the barrel, and the air inlet 21 is inserted with an air intake pipe 22, which has one end inserted out of the housing 101. Moreover, the air intake pipe 22 is received therein with a hollow induced draft pipe 23, which has one end combined with the blast hood 12 and communicating with the blast hood 12. The air intake barrel 20 is further provided with a helical plate 24 along the barrel wall, and the helical plate 24 further surrounds the outer circumferential wall of the induced draft pipe 23.

The filter barrel 30 is installed in the accommodating space 102 and positioned beneath the blower set 10, communicating with the air outlet 121 of the blast hood 12.

The air guide barrel 40 has one end communicating with another end of the air intake barrel 20 and has another end provided with a baffle plate 41. The air guide barrel 40 further has a lower wall bored with a downward air guide opening 42, which is inserted with a connecting pipe 43.

Figure 5:
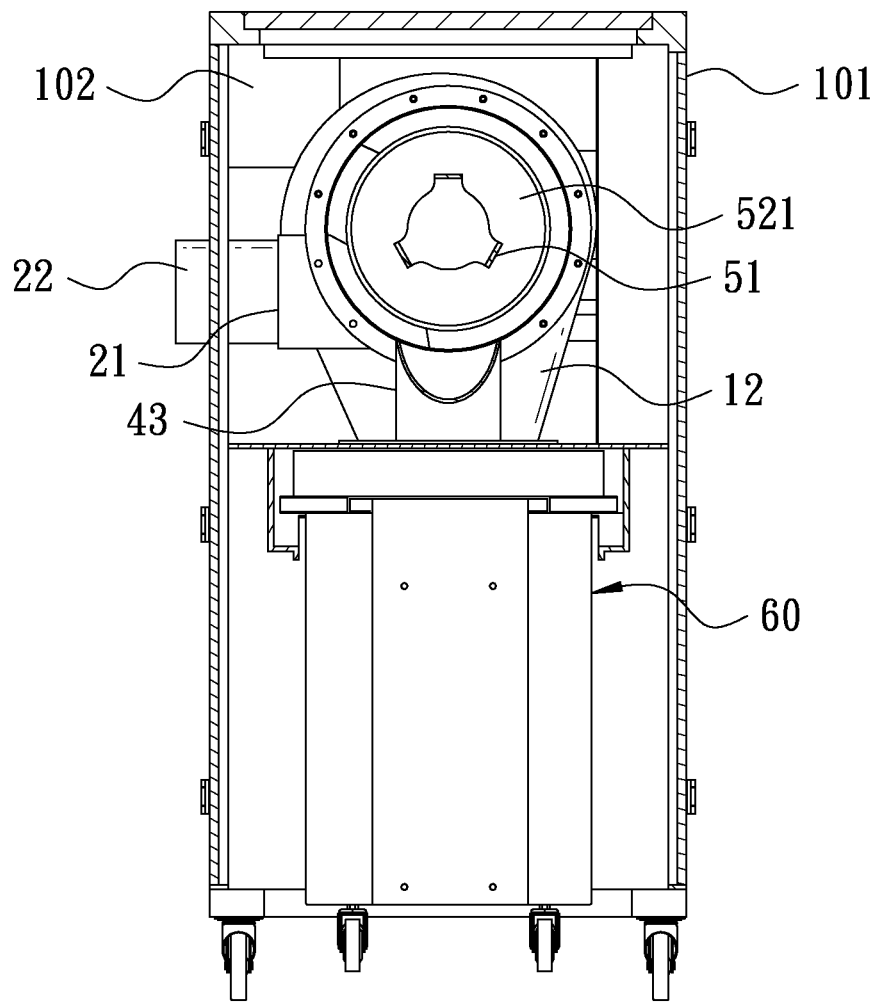
FIG. 5 is a cross-sectional view taken along line 5-5 of FIG. 3, showing a state of a stopping unit.

The stopping unit 50 is mounted in the air guide barrel 40, containing a support member 51 and a stopping head 52. The support member 51 has one end vertically fixed with the baffle plate 41 and another end connected with the stopping head 52. In this preferred embodiment, referring to FIG. 5, the support member 51 is a tripod body, and the orifice of the connecting pipe 43 is directly located beneath the support member 51. The stopping head 52 is cone-shaped, formed with a stopping face part 521 and a pointed end part 522. The stopping face part 521 is parallel to the baffle plate 41 of the air guide barrel 40 and perpendicular to the support member 51, and the pointed end part 522 is provided facing the blower set 10.

The dust collecting barrel 60 is received in the accommodating space 102, located beneath the air guide barrel 40 and connected with another end of the connecting pipe 43.

The sound-absorbing cottons 70 are stuck on the inner circumferential wall of the housing 101.

Figure 6:
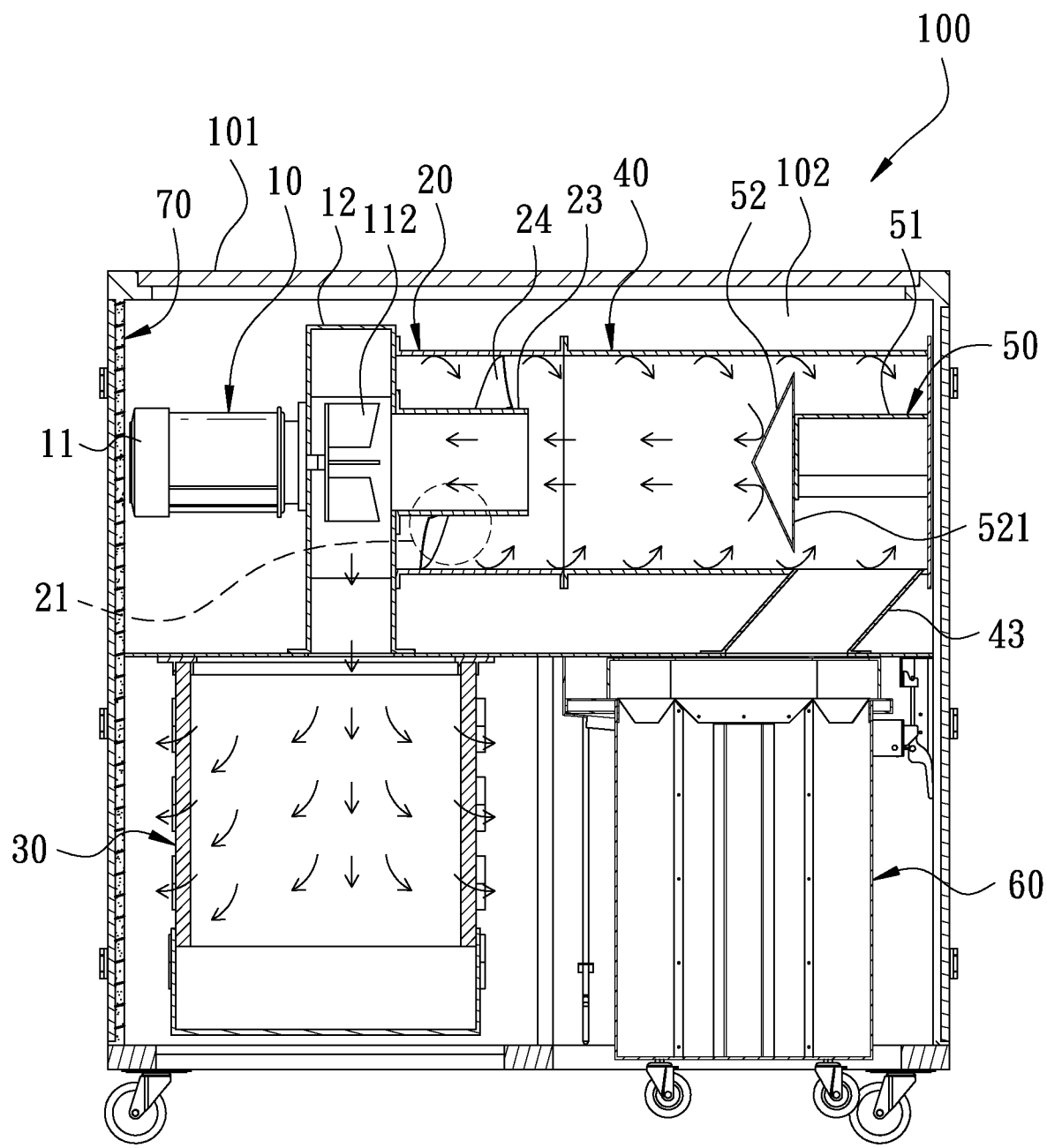
FIG. 6 is a schematic view of the transverse secondary dust collector in use in the present invention, showing an airflow actuation state.
Figure 7:
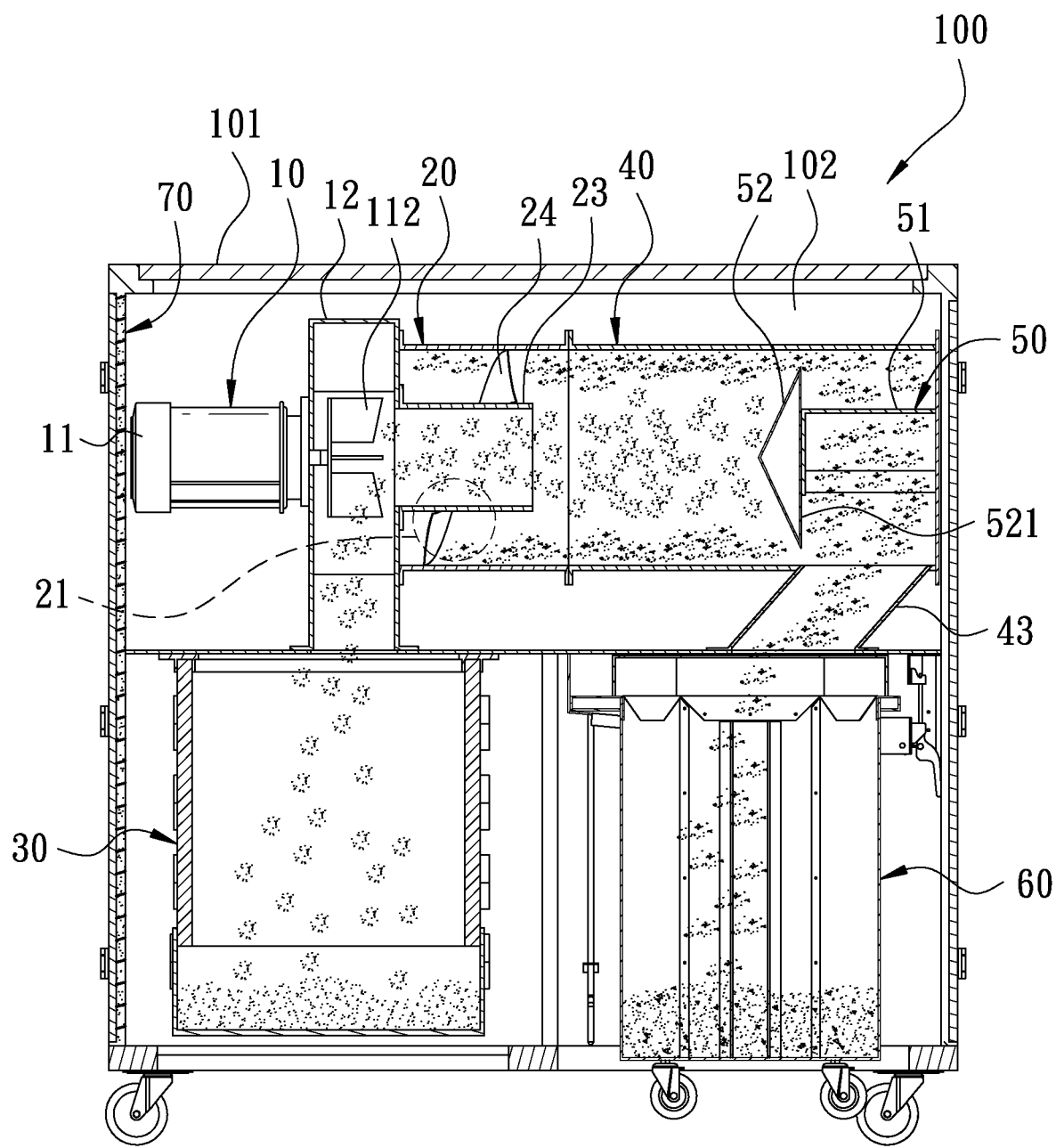
FIG. 7 is a schematic view of the transverse secondary dust collector in use in the present invention, showing a dust flow state.

In use, referring to FIGS. 6 and 7, after the transverse secondary dust collector 100 is started, the blades 112 will be driven by the blower motor 11 to rotate and actuate the air in the interior of the blast hood 12 to produce suction in the air intake barrel 20 for sucking outside dust into the air intake barrel 20 through the air inlet 21. Synchronously, the dust will flow along the helical plate 24 and then get into the air guide barrel 40 and thus, a helical airflow gradually circling round toward the baffle plate 41 can be naturally produced at the inner wall surface of the air guide barrel 40. In the process of sucking in dust, kinetic energy of the dust will be gradually reduced; therefore, heavy dust, after lowering kinetic energy, will naturally fall into the dust collecting barrel 60 beneath the air guide barrel 40. Furthermore, the stopping unit 50 is set in the air guide barrel 40, and the stopping face part 521 is formed with a predetermined stopping area; therefore, the stopping face part 521 is able to stop a part of the heavy dust that still can be actuated to float toward the induced draft pipe 23 by the circling round airflow produced by the blades 112, letting heavy dust stopped by the stopping face part 521 and fall into the dust collecting barrel 60, thus making the first dust filtration more assured. Simultaneously, the rest light and fine dust can be easily attracted by the blades 112 and guided to flow into the filter barrel 30 through the induced draft pipe 23 and then the fine dust will be absorbed on the inner wall of the filter barrel 30, thus completing a secondary dust collection treatment and after filtration, clean air will be again exhausted to the outside. Evidently, unlike the conventional secondary dust collector, the transverse secondary dust collector 100 of this invention does not carry out dust collection by gravity and hence it is unnecessary to increase height of the air guide barrel. Thus, the volume of the air guide barrel 40 can be reduce, and the blower set 10, the air intake barrel 20, the filter barrel 30, the air guide barrel 40 and the dust collecting barrel 60 can be collectively installed in the housing 101, able to diminish the volume of the dust collector, decrease occupied space, facilitate maintenance and lower noise.

What is worth mentioning is that the blower motor 11 is installed in the hermetic housing 101, able to lower noise produced in the operating process of the blower motor 11 and further, the sound-absorbing cottons 70 can function to greatly lower volume of the noise produced by the transverse secondary dust collector 100.

While the preferred embodiment of the invention has been described above, it will be recognized and understood that various modifications may be made therein and the appended claims are intended to cover all such modifications that may fall within the spirit and scope of the invention.

What is claimed is:

1. A transverse secondary dust collector comprising a housing, said housing formed with an accommodating space, said accommodating space provided with a dust collecting barrel and a filter barrel, and characterized by;
    a blower set transversely installed in said accommodating space, said blower set comprising a blower motor and a blast hood, said blower motor having a rotating shaft inserted in said blast hood, said rotating shaft fixed thereon with a plurality of blades, said blast hood provided with an air outlet, said filter barrel positioned beneath said air outlet;
    an air intake barrel being a hollow barrel, said air intake barrel having one end connected with said blast hood, said air intake barrel provided with an air inlet along a tangent of the barrel, said air inlet inserted with an air intake pipe; and
    an air guide barrel having one end communicating with another end of said air intake barrel, said air guide barrel having another end set with a baffle plate, said air guide barrel having a lower wall bored with an air guide opening facing downward, said air guide opening inserted with a connecting pipe, said connecting pipe having another end connected with said dust collecting barrel, said dust collecting barrel disposed beneath said air guide barrel.

2. The transverse secondary dust collector as claimed in claim 1, wherein said air guide barrel is further provided therein with a stopping unit, said stopping unit comprising a support member and a stopping head, said support member having one end vertically secured with said baffle plate, said support member having another end connected with said stopping head.

3. The transverse secondary dust collector as claimed in claim 2, wherein said stopping head is cone-shaped, said stopping head formed with a stopping face part and a pointed end part, said stopping face part parallel to said baffle plate of said air guide barrel and perpendicular to said support member, said pointed end part provided facing said blower set.

4. The transverse secondary dust collector as claimed in claim 2, wherein the orifice of said connecting pipe exactly located beneath said support member.

5. The transverse secondary dust collector as claimed in claim 2, wherein said support member is a tripod body.

6. The transverse secondary dust collector as claimed in claim 1, wherein said housing has inner side wall stuck with a plurality of sound-absorbing cottons.

7. The transverse secondary dust collector as claimed in claim 1, wherein said air intake barrel is received therein with a hollow induced draft pipe, said induced draft pipe having one end combined with said blast hood and communicating with said blast hood, said induced draft pipe having another end corresponding to said air guide barrel and communicating with said air guide barrel.

8. The transverse secondary dust collector as claimed in claim 7, wherein said air intake barrel is provided with a helical plate along the barrel wall, said helical plate further surrounding an outer circumferential wall of said induced draft pipe.

9. The transverse secondary dust collector as claimed in claim 1, wherein said housing is a sealable square housing.

\* \* \* \* \*